(12) United States Patent
Yoshioka et al.

(10) Patent No.: US 6,852,646 B2
(45) Date of Patent: Feb. 8, 2005

(54) METHOD FOR FORMING A DIELECTRIC FILM

(75) Inventors: Toshihiro Yoshioka, Tokyo (JP); Akira Miyakoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/190,510

(22) Filed: Jul. 9, 2002

(65) Prior Publication Data

US 2003/0013244 A1 Jan. 16, 2003

(30) Foreign Application Priority Data

Jul. 10, 2001 (JP) ........................................ 2001-209269

(51) Int. Cl.[7] .......................................... H01L 21/8238
(52) U.S. Cl. ........................ 438/778; 438/704; 438/724; 438/734; 438/757; 438/785
(58) Field of Search ................................ 438/240, 444, 438/627, 690, 704, 724, 734, 757, 785

(56) References Cited

U.S. PATENT DOCUMENTS 3,982,887 A 9/1976 Kendziora et al.
5,266,027 A 11/1993 Kuwayama
6,582,972 B1 * 6/2003 Joshi et al. ..................... 438/3

FOREIGN PATENT DOCUMENTS

| EP | 0 908 928 A2 | 4/1999 |
|---|---|---|
| JP | 08017337 | 1/1996 |
| JP | 08-017337 | 1/1996 |
| JP | 11-108559 | 4/1999 |
| JP | 2000040470 | 2/2000 |

* cited by examiner

Primary Examiner—David Nelms
Assistant Examiner—Renee R. Berry
(74) Attorney, Agent, or Firm—Young & Thompson

(57) ABSTRACT

A method for forming a dielectric film in a PDP includes the steps of: reducing the ambient pressure of an insulating film including a dielectric material before the ambient temperature reaches the reaction temperature of the dielectric material; introducing heated gas to increase the ambient pressure up to the atmospheric pressure while maintaining the ambient temperature at the reaction temperature; and lowering the ambient temperature down to the solidifying temperature of the insulating film while maintaining the atmospheric ambient pressure.

9 Claims, 6 Drawing Sheets

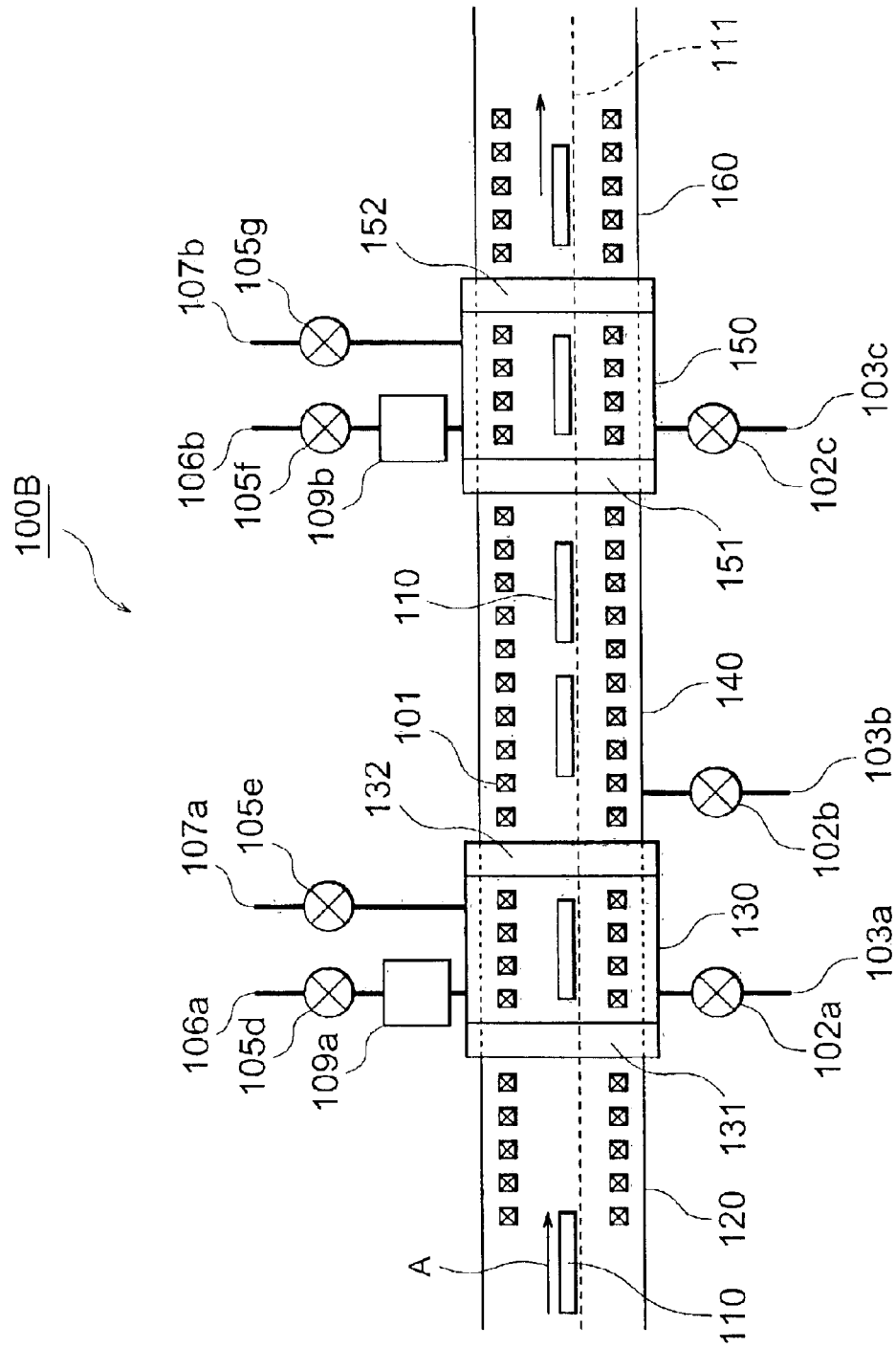

METHOD FOR FORMING A DIELECTRIC FILM

BACKGROUND OF THE INVENTION (a) Field of the Invention

The present invention relates to a method for forming a dielectric film and, more particularly, to a method for forming a dielectric film having a relatively large thickness and a relatively large area. The present invention also relates to a system for forming a dielectric film on a substrate.

(b) Description of the Related Art

A plasma display panel (PDP) is known as a flat display panel especially suited to achieving a large screen, and generally used in a personal computer, a work station, or a wall TV.

A PDP has a front panel and a rear panel sandwiching therebetween a plurality of phosphors, a plurality of sustaining electrodes and a thick dielectric film, wherein the phosphors are formed on the rear panel and the sustaining electrodes and the thick dielectric film are consecutively formed on the front panel. In order to form the thick dielectric film on the front panel, paste including powder of a dielectric material is applied to the front panel by using a screen printing, die-coat or green sheet technique, followed by drying, heating of the same up to the softening temperature and the reaction temperature of the dielectric powder, and then baking the dielectric powder. In general, the dielectric film includes a plurality of layers consecutively formed, if the dielectric film has a large thickness.

The baking step is generally conducted at an atmospheric pressure, wherein the dielectric film is maintained at the baking temperature for a relatively long time if the dielectric film having a thickness around 30 micrometers or above is baked at a time. The baking temperature allows the dielectric film to have a high fluidity and thereby discharge bubbles from the dielectric film, whereby the dielectric film has a high transparency after the baking.

Patent Publication JP-A-8-17337 describes a method for heating and baking dielectric powder at a reduced ambient pressure of 0.27 to 0.40 Pa, for example, wherein the dielectric powder is allowed to effectively discharge cracked gas components during the heating.

In the described technique, if the dielectric powder is subjected to the baking at a lower ambient temperature and thus at a lower fluidity thereof, the degassing effect is relatively limited. To raise the degassing effect, it may be considered to conduct the baking for a long time, or a plurality of times for the single dielectric layer. However, this involves a lower throughput and higher costs for obtaining the dielectric film.

In addition, the lower fluidity may leave bubbles (or air gaps) having large dimensions in the resultant dielectric film due to the reduced pressure which generally expands the bubbles in the molten dielectric material. This involves reduction of breakdown voltage of the resultant dielectric film, especially in the case of low-melting-point glass, which is generally baked at around the softening temperature thereof. Further, if reduction of the transparency is associated with generation of the bubbles, the resultant PDP has a poor brightness in the discharge thereof.

SUMMARY OF THE INVENTION

In view of the above problems in the conventional technique, it is an object of the present invention to provide a method for forming a relatively thick dielectric film having a higher transparency and a higher brightness, without using a long-time baking or without involving reduction of the throughput. The present invention also provides a system for forming such a dielectric film, especially suited to fabricating a PDP.

The present invention provides a method for forming a dielectric film, including the steps of: forming an insulating film including a dielectric material on a substrate; raising an ambient temperature of the insulating film up to a reaction temperature of the dielectric material or above and reducing an ambient pressure of the insulating film before the ambient temperature reaches the reaction temperature; increasing the reduced ambient pressure up to a substantially atmospheric pressure at a specified timing while maintaining the ambient temperature substantially at the reaction temperature or above; and lowering the ambient temperature down to a solidifying temperature of the insulating film while maintaining the ambient pressure at the substantially atmospheric pressure.

The present invention also provides a system for forming a dielectric film including: a filming device for forming an insulating film including a dielectric material on a substrate; a heater for raising an ambient temperature of the insulating film up to a reaction temperature of the dielectric material or above; a pressure control unit for reducing an ambient pressure of the insulating film before the heater raises the ambient temperature up to the reaction temperature; a gas introduction unit for introducing gas heated at the reaction temperature or above to increase the reduced ambient pressure up to a substantially atmospheric pressure while maintaining the ambient temperature at the reaction temperature or above; and a cooling unit for lowering the ambient temperature down to a solidifying temperature of the insulating film while maintaining the ambient pressure at the substantially atmospheric pressure.

In accordance with the method and system of the present invention, the number of the bubbles (gas bubbles or air gaps) formed in the resultant dielectric film can be reduced by the reduced ambient pressure, and the dimensions of the bubbles remaining in the insulating film after reduction of the ambient pressure can be reduced by the step of increasing the reduced ambient pressure. Thus, the number and the dimensions of the bubbles can be reduced in the resultant dielectric film, whereby the resultant dielectric film has excellent film properties such as higher withstand voltage, higher density and higher transparency.

The above and other objects, features and advantages of the present invention will be more apparent from the following description, referring to the accompanying drawings.

BRIEF DESCRIPTION OF THE DRAWINGS

FIG. 3 is a schematic sectional view of a system for forming a dielectric film according to a second embodiment of the present invention.

PREFERRED EMBODIMENTS OF THE INVENTION

Figure 1:
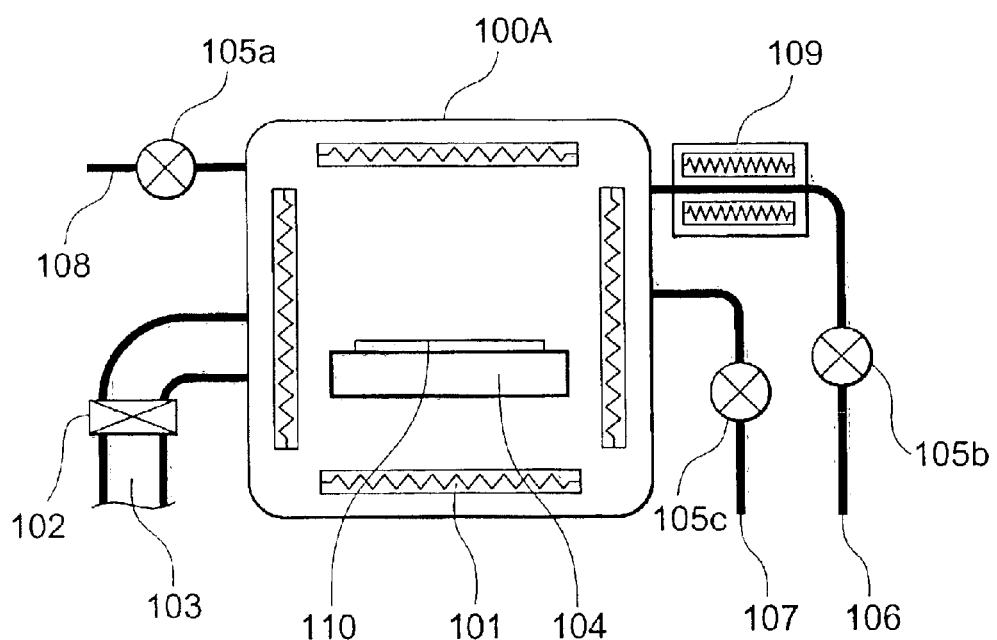
FIG. 1 is a schematic sectional view of a system for forming a dielectric film according to a first embodiment of the present invention.

Now, the present invention is more specifically described with reference to accompanying drawings, wherein similar constituent elements are designated by similar reference numerals.

Referring to FIG. 1, a system for forming a dielectric film according to a first embodiment of the present invention includes a batch-type baking furnace 100A receiving therein a mounting table 104 which mounts thereon a substrate 110 and has four heaters 101 surrounding the mounting table 104. The baking furnace 100A is connected with an exhaust system 103 including an exhaust gate valve 102, a leakage system system 108 including a gas valve 105a, a gas re-introduction system 106 including a gas valve 105b and a gas heater 109, and a gas introduction system 107 including a gas valve 105c.

Figure 2A:
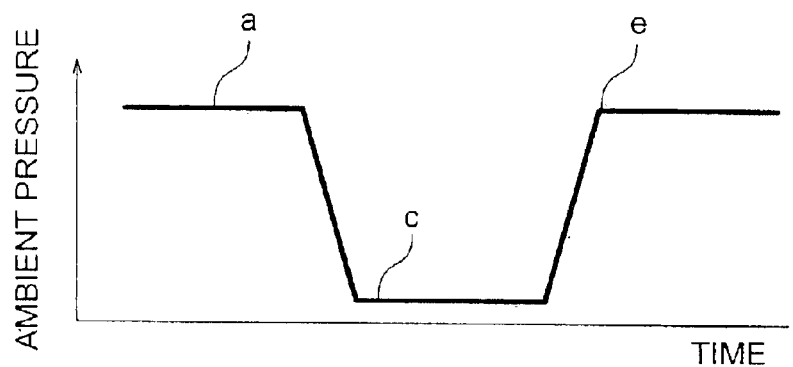
FIGS. 2A and 2B are an ambient pressure profile and an ambient temperature profile, respectively, employed in the system of FIG. 1.
Figure 2B:
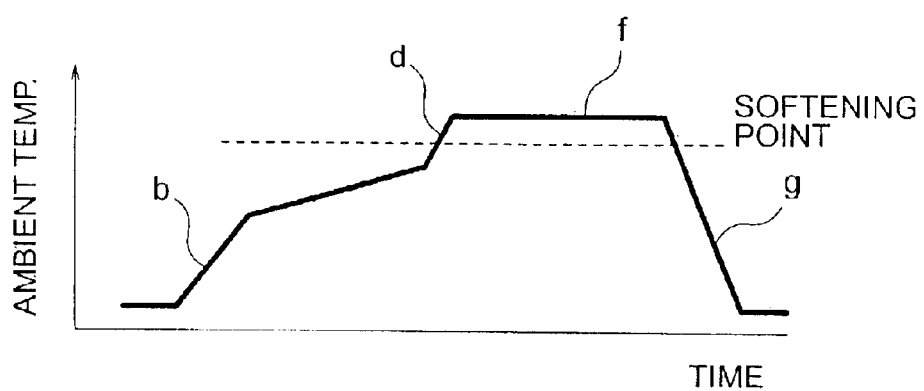

Referring to FIGS. 2A and 2B, there are shown an ambient pressure profile and an ambient temperature profile used in the system of FIG. 1 for forming a dielectric film on the substrate 110. First, paste including dielectric powder is applied onto the substrate 110, followed by placing the substrate 110 on the mounting table 104. Subsequently, the temperature in the furnace 110A is raised as denoted by (b) in FIG. 2B, under the normal pressure denoted by (a) in FIG. 2A. In this step, if the dielectric powder includes an organic component, the ambient temperature is raised up to a temperature of, for example, 250 to 450 degrees C., which allows the organic component to be decomposed and desorped under the ambient conditions sufficient for decomposition and desorption thereof. The heating process may be conducted at atmospheric condition, and may be preferably conducted at an ambient condition including gas such as oxygen for reducing the processing time.

Before the ambient temperature reaches a softening point or reaction temperature (denoted by dotted line) which allows the dielectric powder to be softened and melted, the exhaust system 103 is operated to reduce the ambient pressure inside the baking furnace 100A as denoted by (c) in FIG. 2A. In the reduced ambient pressure, the ambient temperature is raised up to the reaction temperature as denoted by (d), such as around 450 to 700 degrees C. While maintaining the ambient temperature above the reaction temperature as denoted by (f) in FIG. 2B, the ambient pressure is increased, as denoted by (e) in FIG. 2A, up to a pressure equal to the initial pressure (a) at a specified timing. This timing is determined by the degree of the reaction proceeding wherein the particles in the glass powder are well couple together, for example.

While maintaining the ambient pressure (e), the baking temperature is gradually lowered from the reaction temperature down to a temperature which allows the molten dielectric powder to solidify and form a thick dielectric layer. In this process, the ambient temperature is lowered while maintaining the ambient pressure. However, the ambient temperature may be lowered while increasing the ambient pressure inside the furnace 100A.

By using the above process, the number of the bubbles (or air gaps) remaining in the resultant dielectric film can be reduced as well as the dimensions thereof, whereby a thick dielectric film having excellent properties such as a higher density and a higher transparency can be obtained with excellent throughput. The filming technique, if applied to a dielectric film covering electrodes in a PDP, achieves a high withstand voltage, high brightness as well as higher reliability for the dielectric film. Since the filming process achieves a thick dielectric film by incorporating a single baking step, the processing time can be reduced to lower the costs for the PDP.

In the step (e) for increasing the ambient pressure, a gas such as dried nitrogen may be introduced into the baking furnace 100A via the gas re-introduction system 106 while heating the gas with the heater 109. This process maintains the ambient temperature inside the furnace 100A above the reaction temperature in the step of increasing the ambient pressure inside the furnace 100A.

Referring to FIG. 3, a system for forming a dielectric film according to a second embodiment of the present invention includes a belt-type inline baking furnace 100B which is associated with a substrate carriage system 111. The inline baking furnace 100B includes a heating chamber 120 for heating the substrates 110 at an atmospheric pressure, a load-locked replacement chamber 130, a baking chamber 140 for baking the substrates at a reduced pressure, a load-locked replacement chamber 150, and a cooling chamber 160, which are arranged in this order along the direction in which the substrate carriage system 111 transfers the substrates 110. The replacement chamber 130 has an inlet gate 131 and an outlet gate 132, whereas the replacement chamber 150 has an inlet gate 151 and an outlet gate 152.

The replacement chamber 130 is connected with an exhaust system 103a including an exhaust gate valve 102a, a gas re-introduction system 106a including a gas valve 105d and a gas heater 109a, and a gas introduction system 107a including a gas valve 105e. The replacement chamber 150 is connected with an exhaust system 103c including an exhaust gate valve 102c, a gas re-introduction system 106b including a gas valve 105f and a gas heater 109b, and a gas introduction system 107b including a gas valve 105g.

In the above configuration, the heating chamber 120 is provided preceding the replacement chamber 130, whereas the baking chamber 140 is provided preceding the replacement chamber 150. The baking chamber 140 includes a heater 101.

In operation of the system of FIG. 3, a substrate 110, onto which paste including dielectric powder is applied, is transferred by the substrate carriage system 111 in the direction of arrow "A", and introduced to the inlet gate 131 via the heating chamber 120. In the heating chamber 120, the substrate temperature is raised during the carriage thereof depending on the location at which the substrate 110 resides. That is, the substrate 110 is heated along a predetermined temperature profile having a specified temperature slope under the atmospheric pressure.

After the introduction of the substrate 110 into the inlet gate 131, the replacement chamber 130 is closed at the inlet gate 131 and the outlet gate 132 and maintained at an atmospheric pressure inside the chamber 130 similarly to the heating chamber 120. Then, the inlet gate 131 is opened to allow the substrate 110 to advance into the replacement chamber 130, followed by closing of the inlet gate 131. Thereafter, the ambient temperature is raised inside the replacement chamber 130.

Before the ambient temperature reaches the reaction temperature in the replacement chamber 130, the exhaust gate valve 102a is opened for exhausting the replacement chamber 130, whereby the ambient pressure inside the replacement chamber 130 is lowered down to a pressure equal to the pressure inside the baking chamber 140.

Thereafter, the outlet gate 132 is opened to transfer the substrate 110 from the replacement chamber 130 to the baking chamber 140. In the baking chamber 140, the ambient temperature is changed along a specified temperature profile with respect to the location at which the substrate resides. The dielectric layer is subjected to the temperature slope prescribed in the temperature profile while the substrate is carried in the baking chamber 140 until the dielectric layer is exposed to the reaction temperature. Then, the dielectric layer is maintained above the reaction temperature while the substrate is transferred in the baking chamber.

After the substrate 110 is transferred from the replacement chamber 130 to the baking chamber 140, dried nitrogen heated by the gas heater 109a is quickly introduced into the replacement chamber 130, which then resides in an idle state for waiting arrival of another substrate 110.

The replacement chamber 150 is closed at the inlet gate 151 and the outlet gate 152, and maintained at an ambient temperature and an ambient pressure substantially equal to the ambient temperature and the ambient pressure, respectively, at the end of the baking chamber 140. Then, the inlet gate 151 is opened to receive the substrate 110 in the replacement chamber 150, the substrate having been transferred through the baking chamber 140.

The substrate 110 received in the replacement chamber 150 is transferred therein while being maintained at the reaction temperature. The gas re-introduction system 106b introduces gas into the replacement chamber 150 at a specified timing, whereby the ambient pressure inside the replacement chamber 150 quickly rises up to a pressure substantially equal to the pressure inside the cooling chamber 160. During the gas introduction, gas is introduced into the replacement chamber 150 to increase the ambient pressure while being heated by the gas heater 109b, thereby preventing the ambient temperature from falling below the reaction temperature.

The outlet gate 152 is then opened to transfer the substrate 110 into the cooling chamber 160, followed by closing the outlet gate 152. The replacement chamber 150 is then exhausted to reduce the ambient pressure inside the replacement chamber 150, which resides in an idle state until another substrate is introduced therein. The outlet gate 152 is then closed after the exhaustion of the replacement chamber 150 and reduction of the ambient pressure therein, whereby the cooling chamber 160 has a pressure equal to the ambient pressure before the exhaustion.

The cooling chamber 160 has a temperature slope or temperature profile with respect to the location at which the substrate 110 resides during the transfer of the substrate 110. Thus, the substrate 110 is gradually cooled down along the temperature profile during the transfer of the substrate 110 in the cooling chamber 160 under the ambient pressure which has risen in the replacement chamber 150. This allows the dielectric material in the paste to be solidified to form a thick dielectric film. The above process is continuously applied to a plurality of substrates at any time.

In the belt-type inline baking furnace 100B, as described above, the baking conditions such as the ambient temperature and the ambient pressure are determined based on the location at which the substrate resides during the transfer of the substrate in the belt-type baking furnace 100B. The replacement chambers 130 and 150 are provided for changing the ambient pressure during the baking process by introducing heated gas. The heated gas suppresses change of the ambient temperature inside the belt-type baking furnace 100B, whereby degassing effect by the system is not degraded by the pressure control. The belt-type baking furnace considerably improves the throughput of the filming process.

Figure 4:
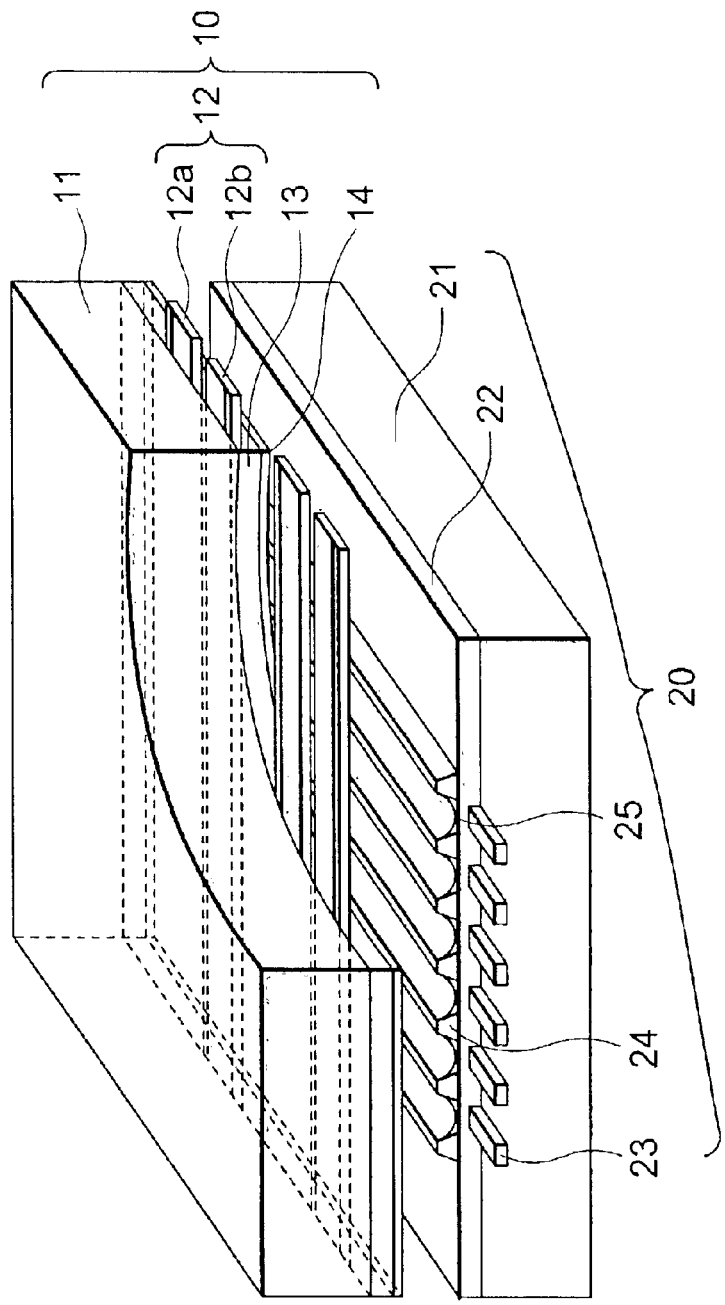
FIG. 4 is a partly-broken perspective view of a surface-discharge PDP manufactured by using a method according to an embodiment of the present invention.

Referring to FIG. 4, a PDP which may be manufactured by using the system shown in FIG. 1 or FIG. 3 includes a front panel 10 and a rear panel 20 opposing each other.

The rear panel 20 includes a rear substrate 21, a white dielectric layer 22, a plurality of selection electrodes 23 sandwiched between the rear substrate 21 and the white dielectric layer 22, and a plurality of phosphors 25 disposed on the white dielectric layer 22 and separated by partitions 24. The front panel 10 includes a front substrate 11, a plurality of sustaining electrodes 12a and 12b made of transparent conductor films and alternately disposed on the front substrate 11, a thick dielectric film 13 made of low-melting-point glass covering the sustaining electrodes 12a and 12b, and an overcoat layer 14.

In the surface-discharge PDP as described above, since the phosphor 25 disposed on the rear substrate 21 emits light through the front panel 10 toward the screen, the transparency of the front panel 10, especially of the thick dielectric film 13, largely affects the output characteristics of the PDP.

In the process for forming the thick dielectric film 13 on the front substrate 11, the sustaining electrodes 12a and 12b are first formed on the front substrate 11, followed by applying paste including dielectric powder onto the sustaining electrodes 12 and 12b and the front substrate 11 and drying the same to form the thick dielectric film 13. The paste is applied to form a thick insulating film by using a screen-printing, blade-coating, or die-coating technique. Instead, the thick insulating film 13 may be formed by laminating a plurality of green sheets.

After drying the paste on the front substrate 11, the thick dielectric film 13 is formed by baking the paste under the baking conditions following the profiles shown in FIGS. 2A and 2B.

More specifically, first, the organic components remaining in the dried paste, i.e., powdery insulating film, are decomposed and removed by heating under an atmospheric pressure. Before the dielectric material in the insulating film reaches to the reaction temperature thereof wherein the dielectric material is softened and melted, the ambient pressure is reduced, whereby the components remaining in the powdery film and causing bubbles in the resultant thick dielectric film are removed under the conditions of a reduced pressure and a moderately high temperature. The reduced pressure may be set at 10 hPa or lower.

Subsequently, the insulating film is heated up to the reaction temperature or above under the reduced ambient pressure, and then the ambient pressure is resumed or increased up to about an atmospheric pressure at a specified timing while maintaining the ambient temperature above the reaction temperature. The increase of the ambient pressure is conducted by introducing heated gas into the chamber for avoiding a temperature fall. The ambient pressure may be set at around 100 hPa instead of the atmospheric pressure. The ambient pressure may be increased several times in a stepwise profile. The resumed ambient pressure is maintained until the ambient temperature is lowered down to the room temperature to solidify the molten dielectric material.

Figure 5A:
FIGS. 5A and 5B are an ambient pressure profile and an ambient temperature profile, respectively, employed in a conventional technique.
Figure 5B:
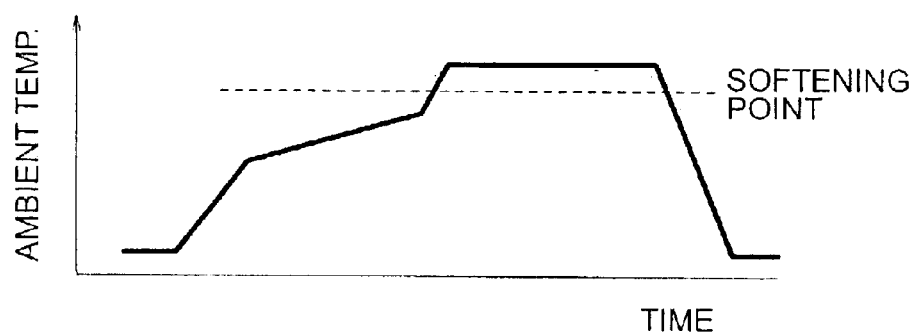
Figure 6A:
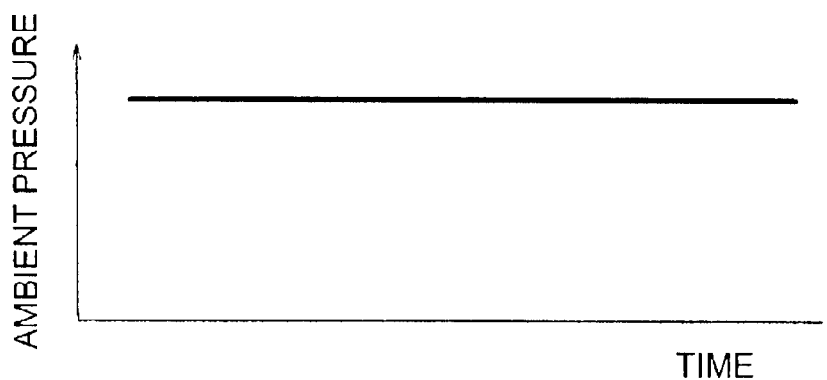
FIGS. 6A and 6B are an ambient pressure profile and an ambient temperature profile, respectively, employed in another conventional technique.
Figure 6B:
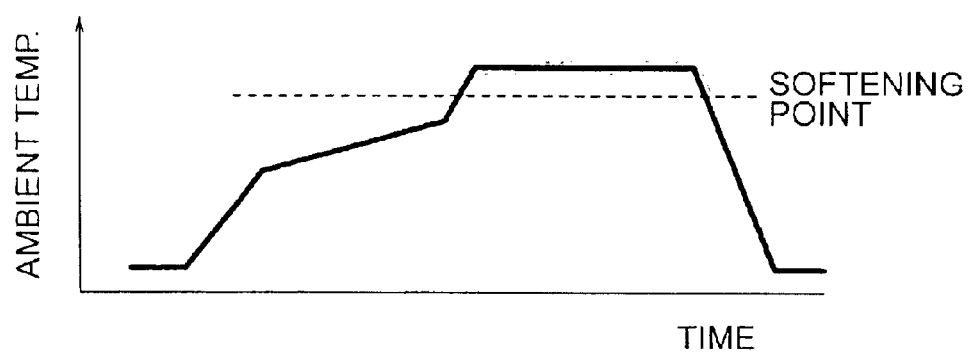

For comparison of the present invention against the conventional technique, profiles of the ambient pressure and the ambient temperature in the conventional technique are shown in FIGS. 5A and 5B, respectively. FIGS. 6A and 6B also show profiles of the ambient pressure and the ambient temperature, respectively, employed in another conventional technique.

In the conventional technique employing the profiles shown in FIGS. 5A and 5B, the ambient pressure is reduced at the initial stage of the baking process before the dielectric material is substantially heated, and the reduced pressure is maintained until the final stage of the baking process at which the ambient temperature is lowered from the reaction temperature to the room temperature.

In the another technique employing profiles shown in FIGS. 6A and 6B, the ambient pressure is maintained at an atmospheric pressure from the initial stage to the final stage, during which the ambient temperature is raised to above the reaction temperature and lowered to the room temperature.

It was confirmed by the experiments that the another conventional technique employing the profiles shown in FIGS. 6A and 6B most generated bubbles in the resultant thick dielectric film, and the conventional technique employing the profiles shown in FIGS. 5A and 5B generated considerable amount of bubbles.

In contrast, the method of the above embodiment employing the profiles shown in FIGS. 2A and 2B generated few bubbles and in addition, the few bubbles remaining in the dielectric film had smaller dimensions, revealing remarkable advantages of the present invention. The presence of the bubbles and the withstand voltage as well as the transparency of the dielectric film have a close relationship therebetween, whereby the thick dielectric film formed by the method of the embodiment had a higher withstand voltage and a higher transparency. The result of this degassing effect was particularly observed in the case wherein a thick dielectric film having a thickness of 30 micrometers or above was formed by a single baking step.

If the temperature of the heated gas introduced during the increase of the ambient pressure is lower during fabrication of a large screen PDP, the ambient temperature may fall below a satisfactory level. This causes a larger range of deviation in the ambient temperature over the dielectric film, thereby generating bubbles in the resultant thick dielectric film. In the embodiment of the present invention, the gas introduced into the chamber is heated to avoid the fall of the ambient temperature, which suppresses the deviation of the ambient temperature from part to part of the dielectric film in the large screen PDP and allows a quick rise of the ambient pressure.

In addition, if the dielectric film is made of low-melting-point glass, the degassing effect of the present invention is more remarkable. Especially in the case of a low ambient temperature, which resulted in a large amount of bubbles in the conventional technique, the present invention achieved a thick dielectric film having excellent properties.

The low-melting-point glass may be a glass material which can be baked at the softening point of the glass. Some of the low-melting-point glass materials have baking points between 450 and 700 degrees C., and examples of the glass materials baked at the softening points have the baking points around between 500 and 600 degrees C.

Since the above embodiments are described only for examples, the present invention is not limited to the above embodiments and various modifications or alterations can be easily made therefrom by those skilled in the art without departing from the scope of the present invention.

What is claimed is:

1. A method for forming a dielectric film, comprising the steps of:

forming an insulating film including therein a dielectric material onto a substrate;

raising an ambient temperature of said insulating film up to a reaction temperature of said dielectric material or above and reducing an ambient pressure of said insulating film before said ambient temperature reaches said reaction temperature;

increasing said reduced ambient pressure up to a substantially atmospheric pressure at a specified timing while maintaining said ambient temperature substantially at said reaction temperature or above; and lowering said ambient temperature down to a solidifying temperature of said insulating film while maintaining said ambient pressure at said substantially atmospheric pressure.

2. The method according to claim 1, wherein said step of increasing said reduced ambient pressure uses ambient gas heated substantially at said reaction temperature.

3. The method according to claim 1, wherein said dielectric material includes glass.

4. The method according to claim 3, wherein said glass is baked around between 450 and 700 degrees C.

5. The method according to claim 1, further comprising the step of forming a plurality of electrodes on said substrate prior to forming said insulating film.

6. The method according to claim 1, wherein said ambient pressure is atmospheric pressure.

7. The method according to claim 1, wherein said ambient pressure is about 100 hPa.

8. A method for forming a dielectric film, comprising the steps of:

applying an insulating film including therein a dielectric material having an organic component onto a substrate;

raising an ambient temperature of said insulating film up to a reaction temperature of said dielectric material or above and reducing an ambient pressure of said insulating film before said ambient temperature reaches said reaction temperature to decompose the organic component;

increasing said reduced ambient pressure up to a substantially atmospheric pressure at a specified timing while maintaining said ambient temperature substantially at said reaction temperature or above; and lowering said ambient temperature down to a solidifying temperature of said insulating film while maintaining said ambient pressure at said substantially atmospheric pressure to reduce a number of bubbles in said insulating film.

9. A method of degassing a dielectric film, comprising the steps of:

applying an insulating film including therein a dielectric material onto a substrate;

raising a temperature of said insulating film up to a reaction temperature of said dielectric material or above and reducing a pressure of said insulating film below atmospheric pressure before said temperature reaches said reaction temperature;

increasing said reduced pressure up to substantially atmospheric pressure at a specified timing while maintaining said temperature substantially at said reaction temperature or above; and lowering said temperature down to a solidifying temperature of said insulating film while maintaining said pressure at said substantially atmospheric pressure to reduce a number of bubbles in said insulating film.

* * * * *